UNITED STATES PATENT OFFICE.

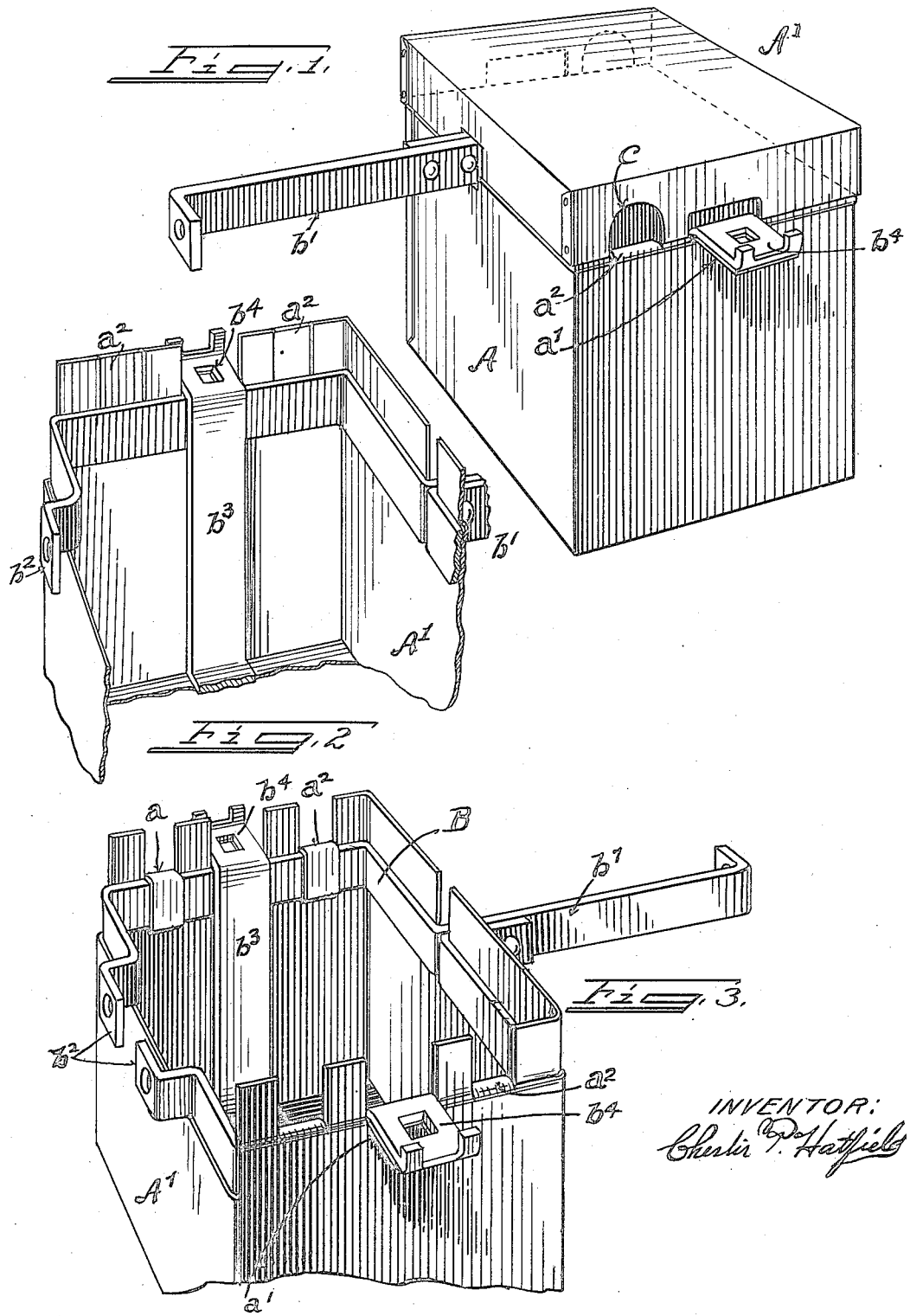

CHESTER P. HATFIELD, OF LEBANON, OHIO.

PROTECTIVE COVERING FOR STORAGE-BATTERY CELLS.

1,384,063.  Specification of Letters Patent.  Patented July 12, 1921.

Application filed November 22, 1920. Serial No. 425,722.

*To all whom it may concern:*

Be it known that I, CHESTER P. HATFIELD, a citizen of the United States, residing at Lebanon, in the county of Warren and State of Ohio, have invented new and useful Improvements in Protective Coverings for Storage-Battery Cells, of which the following is a specification.

My invention contemplates a protective covering for the storage battery cells provided for the self starting of automobiles from a state of rest.

In Ford cars which constitute a very large proportion of those in use, these cells are carried in a rectangular frame consisting of a band, having secured to and between two opposite sides, a depending yoke carrying the cells constituting the battery. The frame has a projection extending at one of the free sides which enters and is engaged with the frame or chassis and the cells are exposed to dust and mud requiring frequent cleansing, in default of which the proper function is impaired.

As applied to the standardized skeleton supporting frame my protective covering is formed to engage said frame by slipping said covering into place from below upward surrounding the horizontal yoke-bracket of the battery-support, without removal or change of any existing part; and securing said covering in place by bending its prepared flaps inwardly over said yoke-bracket, and by also at each end passing the hold-down bolt that passes through the yoke-bracket through the central flap of the case bent outwardly. The simplicity of the device and of its mode of application enables it to be installed or removed without difficulty by any one, including the operator of the automobile with little or no skill and can therefore be manufactured and sold as a useful article of manufacture complete in itself and renewable as desired.

My invention is illustrated in the accompanying drawings, in which—

Figure 1, is a perspective view of the complete casing as attached and in use,

Fig. 2, an inside view of a portion of the casing and support, and

Fig. 3, a similar view of the upper part of the complete casing and support.

Referring now to the drawings, $A^1$ designates the protective casing, being a rectangular boxing of sheet metal open at the top, provided with a removable cover, and adapted to be seated by emplacement from below upon the present standard holder B employed to contain and support the storage battery cells of the self-starting mechanism of a large class of automobiles. $A^2$ designates the removable cover of the casing $A^1$.

This holder as usually constructed and used consists of a strip of metal B bent to a rectangular contour in a horizontal plane with a central straight projection $b^1$ at one side and bent outward at the opposite side into two disconnected shorter projections $b^2$ $b^2$, these projections $b^1$ $b^2$ extending to and connected with the opposite longitudinals of the chassis. The two free sides are connected inwardly by a depending yoke $b^3$, the bottom portion of which constitutes the support of the storage batteries (not shown). The extreme ends of the yoke $b^3$ are bent outwardly as at $b^4$ over the top of the strip B and constitute seats for clamp (not shown).

The rectangular covering $A^1$ is of such lateral dimensions as that when emplaced from below as far as permitted by the bottom of the yoke $b$, it extends upward at three sides as shown outside of the yoke support B and somewhat above the same, being recessed at opposite sides by side cuts to admit of a projecting flap $a^1$ seating upwardly against the outward projection $b^4$ of the yoke $b^3$. Similar side cuts in the upward projection of the side walls of the covering $A^2$ allow flaps $a^2$ to be turned inward over the support $A^1$—the flaps $a^1$ and $a^2$ furnishing engaging stops in both directions and seating and supporting the casing upon the yoke support B.

The remaining side of the casing is carried only high enough to seat upwardly against the projections $b^2$.

The cover $A^2$ conforms to the part $A^1$ resting upon the remaining portions of the walls with recesses for the outward projections $b^1$ and $b^2$. At the two sides of the cover in diagonally opposite relations, the cover is cut away as indicated at $c$ for the outward passage of the lead wires (not shown). The cover will be proportioned to seat and hold its place by friction.

There is thus formed a protective casing for the starting batteries, easily applied or removed without professional skill or aid.

I claim as my invention and desire to secure by Letters Patent of the United States:

1. A protective casing for the batteries of self-starting automobiles, conformed to the battery and its supporting bracket-yoke and adapted to be slipped up over same from below and inclose battery and yoke, said casing extending above said yoke and provided with suitably spaced slits forming flaps adapted to be manually bent inward over and engaged upon the supporting yoke; and a removable cover adapted to seat externally upon the upper portion of said casing.

2. In combination with a battery supporting element consisting of a horizontal rectangular frame having a centrally depending strip for carrying the battery cells, and a laterally extending arm adapted to engage the opposite longitudinal of the chassis, a protective covering consisting of a rectangular body open at the top and adapted to be inserted to position from below surrounding and extending above the rectangular frame and held to place by suitably spaced flaps of the casing material bent inward and downward over the said frame, and a removable covering surrounding and fitting upon the upper end of the casing.

3. A protective covering for the battery elements of self-starting automobiles consisting of an integral casing of sheet metal adapted to be inserted from below and inclose and extend above the horizontal yoke support of the cells and be upheld thereon by flaps of the casing material bent over said support, and a removable hood or cover adapted to be inserted in place from above and seat externally upon the upward projection of the casing and provided with openings for lead wires and for the outwardly projecting seats of the yoke clamps.

4. A protective casing for the battery of self-starting automotive vehicles, having the standard bracket-yoke support upon the chassis, said casing consisting of a sheet metal boxing conformed to the shape of the bracket-yoke and battery open at top adapted to be seated in position by insertion upward from below to embrace and extend somewhat above the bracket-yoke, said casing having slits in its upper edge at opposite sides forming tongues to be bent over the yoke inwardly as supports for the casing and to form exits for the lead wires; and a corresponding cover adapted to seat from above frictionally and externally on the casing above the zone of the bracket-yoke.

In testimony whereof I have hereunto set my hand in presence of two subscribing witnesses.

CHESTER P. HATFIELD.

Witnesses:
CARL PHARES,
LEWIS M. HOSEA.